Figure 6:
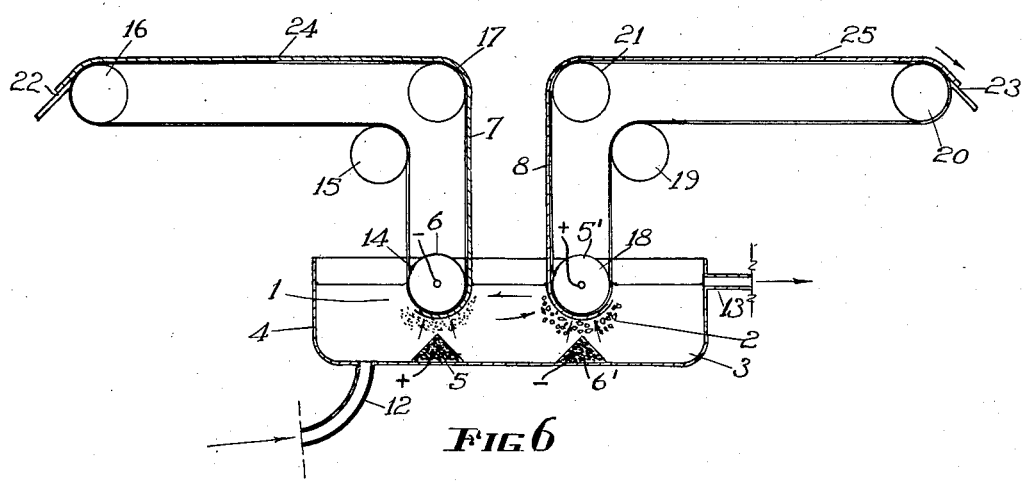

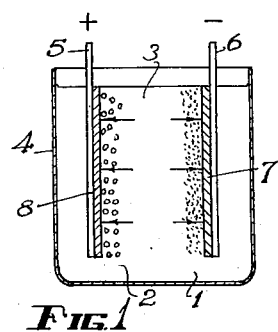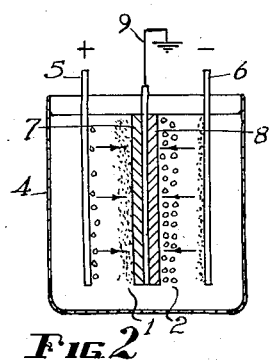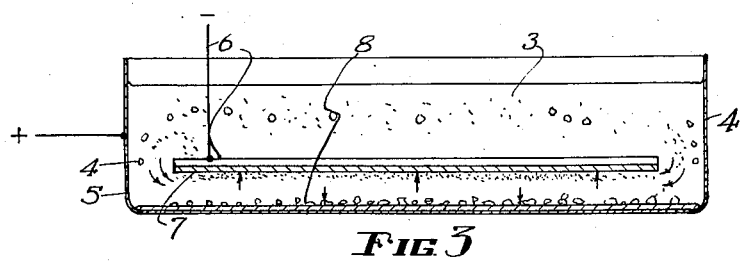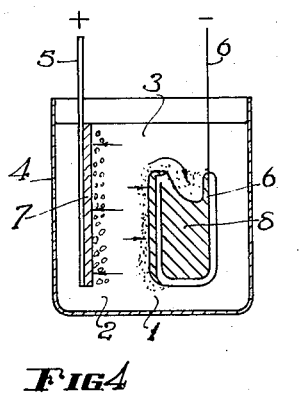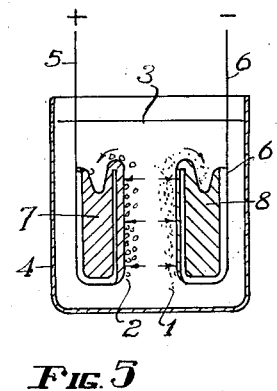

United States Patent Office 2,900,320
Patented Aug. 18, 1959

2,900,320

SOLID SEPARATION BY ELECTROPHORETIC MEANS

Kenneth Archibald Metcalfe, Graymore, and Robert John Wright, South Payneham, Australia, assignors to Commonwealth of Australia care of the Secretary of the Department of Supply, Melbourne, Victoria, Australia Application July 5, 1957, Serial No. 670,286

Claims priority, application Australia July 9, 1956

1 Claim. (Cl. 204—300)

This invention relates to a method of solid separation by electrophoretic means.

Solid separation by electrostatic means has been performed heretofore by passing the minerals in a finely divided form past electrically charged plates to which selective deflection results.

Prior art shows that separation of particles from gases or insulating fluids has been effected by ionising the air or other carrier for the particles so that electrical precipitation or movement results because of the ionised carrier.

According to the known art a sufficiently high voltage is used under the particular conditions obtaining to ensure that both negative and positive ions are produced at the discharge electrode, these then migrating towards appropriately charged electrodes, and in this action moving the solid particles with them One of the problems associated with solid separation in an ionised medium is that ionisation normally takes place at a point just preceding a brush discharge or arc-over between the electrodes, and methods have therefore been devised utilising currents of short impulse duration such that, while the field strength is sufficient to effect substantial ionisation, the duration factor prevents arcing over.

The ionisation method has, it is believed, been also proposed for the separation of liquid emulsions, but the same problems exist as are present with a gas, and safe electrical precipitation can only be effected if the current flow is kept within reasonable limits, high enough to get the maximum amount of ionisation but low enough to prevent the possibility of arcing or disruptive discharge.

It is known that methods utilising ionisation of a gas or other carrier medium introduce considerable problems when applied to materials of a non-conducting, or poorly conducting, nature in that ions of opposite sign are present which are driven by the electrical field to surfaces where they seriously interfere with the separation effects.

It is also clear from the prior art that electrostatic separation is already known which depends on dielectric constant, a mineral mixture being allowed to fall into an electrically non-conducting liquid having a dielectric constant between the dielectric constants of the constituents to be separated, while applying alternating potential to pointed surfaces to cause particles of high dielectric constant to adhere to the points.

Our method also envisages the use of an electrically non-conducting liquid in which the separation is effected, but according to our method separation takes place by applying a directional field to the liquid in such a manner that either the particles will be driven to the respective poles or areas, or electroosmosis will be used for separation effects, the magnitude of the field however being such that significant ionisation of the carrier medium, in this case a non-conducting or insulating liquid, will not take place so that separation depends purely on the surface charge of the particles themselves acting to move the particles in the electrical field.

The method is not to be confused with the processes of depositing substances held in a conducting liquid, because in those relatively heavy current flow exists and particle surface charge effects do not exist in the same way, the movement again being dependent on ionisation or dissociation.

Our invention is essentially carried out in an insulating liquid of high electrical resistivity so that it virtually serves as a non-conductor, and therefore electrodes immersed in it will not have a heavy flow of current between them as would be the case if the liquids were a conductor or if current of such magnitude were used that ionisation of the liquid or dissociation would take place.

It is found that suitable liquids are those in which the Zeta potential predominates over the electro-chemical potential, and particularly useful are the non-polar liquids.

It seems clear that according to our method separation is effected by the inherent properties of solid particles to build up surface charges which will serve to drive the particles through the insulating liquid according to the existence of an induced field, such as towards one or other of the poles or electrodes, and therefore according to the simplest form of separation according to our method, which is where it is desired to separate a solid from a liquid, it is only necessary to drive the solid particle to one or other of the electrodes depending on the character of the liquid and the particle.

On the other hand two solids of opposite polarity, or substantially different charge effects, may be separated by this method as each will be driven towards the area or electrode of appropriate polarity.

The invention can also be extended to the separation of two solids of the same polarity where the polarity varies in magnitude, because it has been shown that where the particles with a stronger field or surface effect are moved towards the pole of opposite polarity, the particles with a lesser magnitude will automatically be driven in the other direction by a differential action, or at least will be moved to an area different from that to which the particles with the greater magnitude will move.

The directional field may be induced by any means such as the application of current to electrodes, or by magnetic means, or even by introducing charged substances which will control the movement of the particles to be separated.

It is also possible to treat minerals or the particles to be separated with a substance which will change the effective surface charge of the particles, such for instance as by the application of a dye, resin, oil, wax or gum or by pyro-electric or photo-electric or magnetic or density effects, and particles may thereby be given the polarity effect, or locally charged areas, which will allow them to be moved to either one or other of the electrodes or appropriate areas.

By placing a diaphragm between the electrodes in all of the above methods, separation can be made dependent on electro-osmosis, the apparatus in this case being arranged so that the diaphragm is appropriately located in relation to the electrodes.

It is of interest to note that when particles are suspended in an insulating liquid in which they have free motion, the particles move rapidly and constantly in all directions, and provided no external electrical field is present, continue this motion as long as they remain suspended. They are thus in an ideal dispersed condition and mobile but without specific direction, and are thus immediately available for organised movement. Work under the microscope shows that with the application of an electrical field, the movement is immediately co-related and directional, and it is this aspect of the behaviour of liquids in an insulating liquid on which our invention is based.

From the foregoing it will be clear that our method of separation concerns the suspension of solids, such as ores to be separated, or materials to be removed from liquids or separated from each other, either with or without treatment, or by additions to the bath to change the surface charge of the particles, in an insulating liquid which allows these charges to be built up, and moving the ores or the means to be separated in the liquid of high electrical resistivity by applying direct current to electrodes or the like of a potential such that significant ionisation which would destroy or counter the surface charge of the particles, does not take place, to drive particularly charged particles in the liquid to the separation areas.

Figure 7:
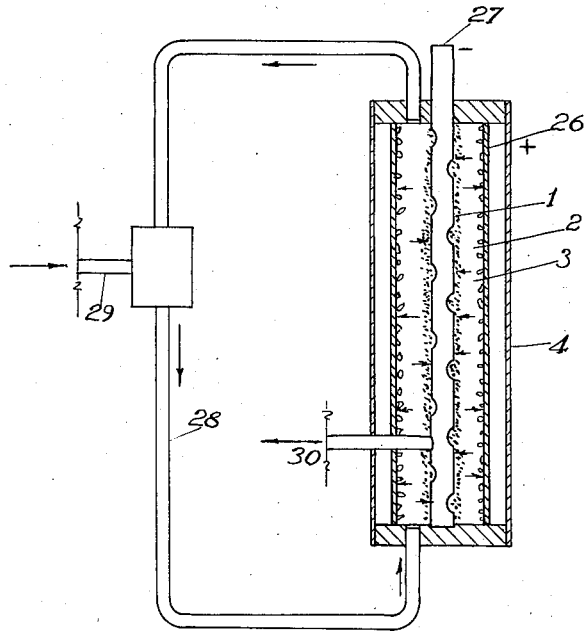

So that the invention will be fully understood embodiments thereof will now be described with reference to the accompanying drawings in which:

Fig. 1 is a schematic view showing how a pair of electrodes can be immersed in the insulating liquid and indicating how separation is effected, Fig. 2 is a similar view but showing how a diaphragm may be used which is disposed between electrodes to act as the collecting agent, Fig. 3 shows how an electrode can be placed into a container of the liquid containing the material to be separated, Fig. 4 shows how it is possible to deposit one of the materials being separated into a container within the liquid, Fig. 5 is a view similar to Fig. 4 but showing how two materials may be selectively deposited into containers, Fig. 6 shows how continuous separation may be effected, and Fig. 7 illustrates diagrammatically a batch apparatus for effecting separation.

A more detailed description with reference to the figures now follows.

Fig. 1 shows a simple form of the invention in which the particles 1 and 2 comprising solids, emulsions, emulsoids, colloids or molecules are suspended or dispersed in the liquid 3 by conventional means such as are used in the manufacture of inks, paint oil dispersions or the like, the liquid 3 being a liquid or mixture of liquids of high volume resistivity. The liquid dispersion is contained in an insulating vessel 4. The electrodes 5 and 6, such as flat metal or other conducting plates are immersed in the dispersion fluid at an appropriate distance from each other depending on the voltage which is to be applied between them but in any case greater than that at which significant ionisation or arcing would occur. Such a voltage may normally range from 500 to 100,000 volts. As a guide, where the base liquid is carbon tetrachloride, and the voltage 15,000, the distance would be one inch. When the voltage is applied across the electrodes, the particles or droplets or molecules 1 are caused to be rejected by the electrode 5 because they possess charges of similar polarity to 5, and to travel across the cell through the liquid 3 and deposit or adhere to or concentrate around the electrode 6. Very thick deposits may be built up on the electrode 6 and retained especially if the field is maintained as the electrode is removed from the cell. Similarly, the particles or droplets or molecules 2, possessing charges of opposite polarity to 1, are caused to be rejected by the electrode 6, and travel across the cell to the electrode 5 and deposit or adhere or concentrate around this electrode. Similarly, thick deposits or high concentrations may be built up if desired. It will of course be appreciated that separation of the particles 1 and 2 from each other depends on the possession of charges of opposite or different polarity which may be induced by their dispersion in the liquid and also by contact electrification of one by the other or by contact electrification of the particles with the vessel itself or the like or with specially introduced electrodes.

Fig. 2 shows another embodiment of the invention in which a third member or electrode 9, is interposed between the two fixed electrodes 5 and 6, the electrode 9 being earthed through a high or a low resistance. The removable member or electrode 9, such as a flat paper or metal sheet or fabric sheet, is caused to receive the coating of particles 1 on one side the coating being designated 7 and and on the other side the coating 8 of the particles 2 when the electrical field is set up between the electrodes 5 and 6. The electrode may be caused to retain a thick deposit on both sides if the electrical field is maintained during removal of the electrode 9.

Fig. 3 shows another embodiment of the invention in which the vessel 4 is identical with the electrode 5 in this case for purpose of illustration a flat metal dish, but this may be of other shape. The other electrode may be a flat plate 6. On application of the electrical field, deposition occurs together with separation of the particles 1 and 2, the particles 1 depositing on or concentrating around the electrode 6 to form a coating 8 whilst the particles 2 deposit on the bottom of the vessel to form coating 7.

Fig. 4 shows another embodiment in which one electrode 6 is shaped to form a hollow container and is immersed in the liquid 3 in the usual way. When the voltage is applied across the electrodes the particles or droplets or molecules 1 are caused to be rejected by the electrode 5 because they possess charges or opposite polarity to 5 and are attracted to and travel across the cell to the electrode 6 through the liquid 3 and deposit or concentrate in and around the hollow container forming the electrode 6, from which they may be removed.

Fig. 5 shows an adaptation in which the electrode 5 is also in the form of a hollow container opening through which the particles 1 are caused to concentrate in the vessel formed by the electrode 6 and the particles 2 are caused to concentrate in the vessel formed by the electrode 5.

Fig. 6 shows another embodiment of the invention where it is desired to separate continuously the particles 1 and 2 and subsequently to dispose of them independently. The mixed particles are dispersed in the liquid in the usual manner and are introduced into the container 4 through the entry pipe 12. A voltage is applied between the electrodes 5 and 6 and 5' and 6', in this case a plurality of electrodes comprising rollers 14 and 18 and pointed electrodes 5 and 6 at the bottom of the vessel; it will be appreciated that pointed electrodes at the bottom of the vessel may not be necessary in some cases but are employed to give direction to the flow of the particles. The web 24, carried by the moving rollers 14, 15, 16 and 17 in a continuous belt, has deposited on it the particles 1 in the form of the coating 7 which is carried in this case anti-clockwise along an outward path to the position 22 where the coating is removed by a scraper or other means. Similarly, the web 25, carried by the moving rollers 18, 19, 20 and 21 is a continuous belt, has deposited on it the particles 2 in the form of the coating 8 which is carried in this case clockwise to the position 23 where the coating is removed by the scraper or other means. It will be seen that the liquid 3 serves as a carrier for the particles and may be used over and over, and the bath is replenished by entry of liquid dispersion through the pipe 12 and removal of denuded liquid through the outlet pipe 13.

Fig. 7 represents another embodiment of the invention suitable for use where it is primarily a matter of separating the particles from a liquid in which they are already dispersed for example paint pigment from a paint for purpose of analysis, in which case it may be necessary in some instances to dilute the paint with a solvent or thinner before separation. The vessel 4 comprises an insulating casing with a conductive lining 26 which is identical with the electrode 5, and a centrally placed tubular or rod electrode 27 which is identical with the electrode 6. The liquid dispersion 3 is passed through the inlet 29 into the circulating tube 28 and passes through the vessel 4 which has suitable bungs at each end. An electrical field is maintained between 26 and 27 and the particles 1 and 2 are caused to deposit on their appropriate electrodes 27 and 26 (that is, 6 and 5). Should the electrode member 27 be a tube, it would be convenient to discharge the deposit in the form of a slurry through the outlet 30. In the case of a solid electrode 27, it would be necessary at intervals to clear the deposit.

It will be appreciated that in this apparatus, although it is primarily a matter of separating pigment material from a carrier liquid it is also a fact that separation of pigments one from the other occurs by deposition on their respective electrodes.

It will also be seen that in all of the examples cited in Figs. 1 to 7 inclusive, it is not necessary to restrict the process to the use of one pair of electrodes, but a multiplicity of electrodes may be used for greater effect.

It is to be understood that in all of the examples cited it is not necessary to limit the form of the electrode or electrodes to a particular shape or configuration. It is possible to use with various effects, but not differing in principle, electrode shapes of many types such as solid shapes, perforated electrodes, rod electrodes, fabrics, grids, or laminar electrodes and the like.

It will be clear that in each case it is not necessary to restrict the liquid 3 to any particular liquid or mixture of liquids; further, a second or third treatment of a particular concentrate may be carried out for further separation, and these subsequent separations may employ other liquids to get differential charging of particular particles.

As examples of the manner in which separation is effected the following are substances amongst the many which when dispersed alone in carbon tetrachloride are attracted to the negative electrode: monolite red pigment, copper sulphate, waxoline nigrosine, monolite yellow, sodium sulphite, potassium bichromate, cotton fibre, asbestos fibre, and cadmium sulphide. By addition of gum dammar in the form of an emulsion, the pigment monolite red, for example, may be caused to go to the positive electrode.

The following are examples of those amongst the many attracted to the positive electrode: magnesium oxide, sawdust, "mouldrite," metol, shellac, calcium carbonate, sulphur, talc, ammonium chloride, lithium hydroxide, gum dammar, and the like. By addition of talc to metol, metol may be caused to be attracted to the negative electrode. By the addition of talc to sulphur, sulphur may be made go to the negative electrode. By addition of sawdust to a suspension of gum dammar, the gum dammar may be made go to the negative electrode.

As an example of the interaction of two materials normally attracted to the negative electrode, the case of monolite red and monolite yellow may be cited in which the monolite red drives the monolite yellow to the positive electrode.

We have found that where the mixture to be separated is pre-milled with an oil such as linseed oil, the separation properties change as the oil is dissolved from the particles by the carrier liquid in some cases. In other cases the separation properties may be held constant for long periods by the use of a carrier liquid which dissolves the oil slowly or not at all. In other cases this solvent action may be put to use, for this action affects some particles sooner or to a greater extent than others. An essential condition here is that the particles are pre-milled with the viscous medium such as the oil. It may be preferred in other cases to disperse the particles in the oil and carrier liquid already mixed, in which case the effects are obtained as the result of selective absorption or adsorption or chemi-sorption rather than by selective solution or reaction as in the previous cases.

Other examples include the separation of the inorganic material cadmium selenide from many organic pigments by their dispersion in a resin-linseed oil-solvent naphtha liquid.

Another example is a substance which as milled and dispersed tends to deposit out on both electrodes, such as fluorescein, which is about equally attracted to each electrode; by adding the organic pigment monolite yellow, the fluorescein is attracted pre-dominantly to the positive electrode.

Tourmaline, boracite, quartz and fluorspar are among the pyro-electric minerals which if heated or cooled, one end becomes positively and the other negatively charged. These effects can be used in their selective separation from other materials.

Magnetic oxide of iron is a typical magnetic mineral which may also be used in separation cells to produce desired effects on other particles, such as to suppress other ferromagnetic materials.

Density effects may also be used to cause one type of particle to fall short of an electrode on which another lighter or lower density material deposits, such as in separating galena (7.3) from zincite (5.5).

The addition of beeswax to a mixture of antimony sulphide and calcium fluoride dispersed in carbon tetrachloride results in the clean separation of the two materials, each one coating thickly on the opposite electrode.

The addition of one material to another in suspension may vary in effect with concentration of the one relative to the other. In some cases there is a critical relative concentration at which both may be made to precipitate out together after the injection of a very small number of electric charges.

What we claim is:

Apparatus for separating solid material from a liquid dispersion thereof, comprising a container having an inlet in the bottom thereof through which said liquid dispersion is introduced to form a bath in said container and an outlet, a positive pointed electrode and a negative pointed electrode disposed between said inlet and outlet in the bottom of said container, a first negatively charged roller disposed opposite said positive pointed electrode and a second positively charged roller disposed opposite said negative pointed electrode, first and second roller means mounted outside said bath, a first continuous web carried on said first charged roller and on said first roller means through said bath, a second continuous web carried on said second charged roller and said second roller means through said bath, scrapers mounted adjacent said first and second roller means and engaging each web, whereby positive and negative charged solid material deposited on said first and second webs, respectively, is removed therefrom by the scrapers.

References Cited in the file of this patent

UNITED STATES PATENTS

| | | |
|---|---|---|
| 894,070 | Schwerin | July 21, 1908 |
| 1,230,524 | Schwerin | June 19, 1917 |
| 1,931,002 | Hazell | Oct. 17, 1933 |
| 2,073,952 | Shepherd | Mar. 16, 1937 |
| 2,107,772 | Wade | Feb. 8, 1938 |
| 2,292,608 | Buckman et al. | Aug. 11, 1942 |
| 2,376,535 | Fisher | May 22, 1945 |
| 2,762,505 | Laurver | Sept. 11, 1956 |
| 2,762,770 | Widmer et al. | Sept. 11, 1956 |
| 2,769,536 | Fraas | Nov. 6, 1956 |
| 2,861,935 | Fahnoe et al. | Nov. 25, 1958 |

FOREIGN PATENTS

| | | |
|---|---|---|
| 442,429 | Great Britain | Feb. 3, 1936 |
| 689,394 | Great Britain | Mar. 25, 1953 |